(12) United States Patent
Chung et al.

(10) Patent No.: US 9,735,883 B2
(45) Date of Patent: Aug. 15, 2017

(54) INTENSITY MODULATED DIRECT DETECTION OPTICAL TRANSCEIVER

(71) Applicants: Sung Chung, Ottawa (CA); Xuefeng Tang, Ottawa (CA); Chuandong Li, Ottawa (CA); Zhuhong Zhang, Ottawa (CA)

(72) Inventors: Sung Chung, Ottawa (CA); Xuefeng Tang, Ottawa (CA); Chuandong Li, Ottawa (CA); Zhuhong Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/060,318

(22) Filed: Mar. 3, 2016

(65) Prior Publication Data

US 2017/0104544 A1    Apr. 13, 2017

Related U.S. Application Data

(60) Provisional application No. 62/239,542, filed on Oct. 9, 2015.

(51) Int. Cl.
*H04B 10/564* (2013.01)
*H04B 10/54* (2013.01)
*H04B 10/2513* (2013.01)
*H04B 10/61* (2013.01)

(52) U.S. Cl.
CPC ..... *H04B 10/541* (2013.01); *H04B 10/25133* (2013.01); *H04B 10/6161* (2013.01)

(58) Field of Classification Search
CPC . G02F 2001/212; G02F 1/0123; G02B 27/46; G02B 6/29313

USPC ........................................................ 398/159
See application file for complete search history.

(56) References Cited

U.S. PATENT DOCUMENTS

| | | | | |
|---|---|---|---|---|
| 5,289,550 A | * | 2/1994 | Plastow | ................ H03F 1/3229 385/31 |
| 2006/0067426 A1 | * | 3/2006 | Maltsev | .............. H04L 27/2602 375/297 |
| 2008/0158640 A1 | | 7/2008 | Watanabe et al. | |
| 2015/0222468 A1 | | 8/2015 | Li et al. | |
| 2015/0256264 A1 | | 9/2015 | Chen et al. | |
| 2015/0263812 A1 | | 9/2015 | Tatsumi | |
| 2015/0270905 A1 | | 9/2015 | Rasmussen et al. | |

(Continued)

OTHER PUBLICATIONS

Jiang Hong Ke et al.; "400 Gbit/s single-carrier and 1 Tbit/s three carrier superchannel signals using dual polarization 16-QAM with look-up table correction and optical pulse shaping"; Optics Express, vol. 22, No. 1 2014.

(Continued)

*Primary Examiner* — Don N Vo
(74) *Attorney, Agent, or Firm* — Gowling WLG (Canada) LLP

(57) ABSTRACT

An optical transceiver using a modulator biased to a non-linear region of the modulator's power transfer function can extend the possible transmission distance of intensity modulated direct detection (IMDD) n-level pulse amplitude modulated (PAM-n) signals. A non-linear look-up-table may compensate for non-linear characteristics of the modulator. An adaptive decision threshold look-up-table may be used to provide adaptive decision levels at the receiver.

21 Claims, 13 Drawing Sheets

(56) References Cited

U.S. PATENT DOCUMENTS

2016/0099775 A1* 4/2016 Liu .................. H04B 10/2507
　　　　　　　　　　　　　　　　　　　　　398/115

OTHER PUBLICATIONS

Suhr, Lau Frejstrup et al.; "10-Gbps duobinary-4-PAM for High-Performance Access Networks"; Proceedings of Asia communications and Photonics Conference 2014; Dec. 31, 2014.
International Search Report of International Patent Appl. No. PCT/CN2016/079211 dated Jul. 5, 2016.
Na Liu et al.; "Nyquist 4-ary pulse amplitude modulation scheme based on electrical Nyquist pulse shaping and fiber Bragg grating filter"; Optical Engineering, vol. 54, No. 4; Apr. 30, 2015. Abstract.

* cited by examiner

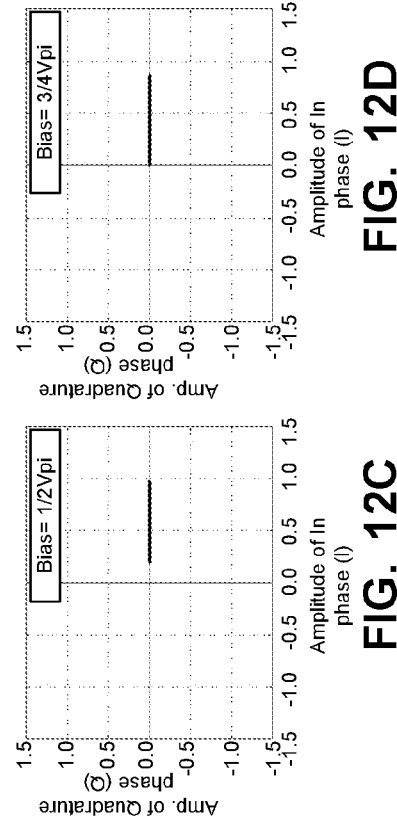
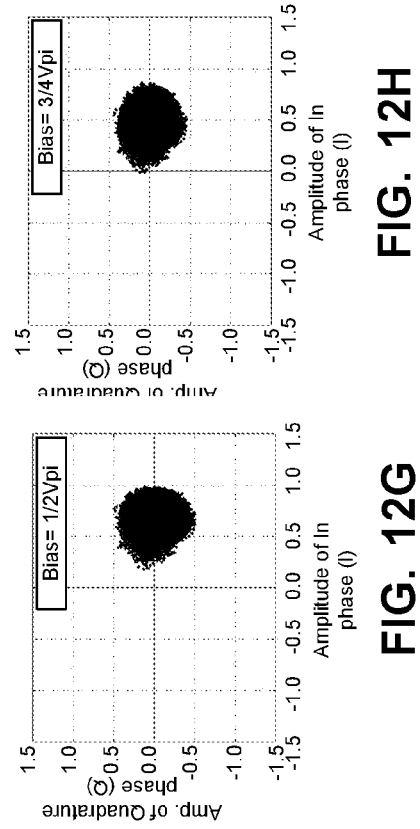
FIG. 12A  FIG. 12B  FIG. 12C  FIG. 12D
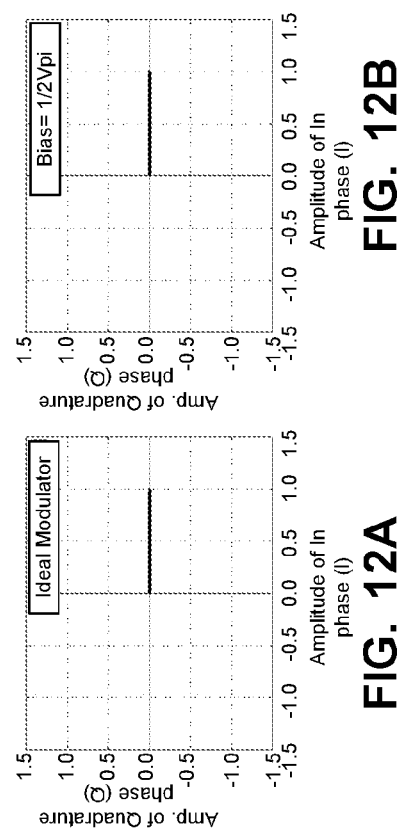
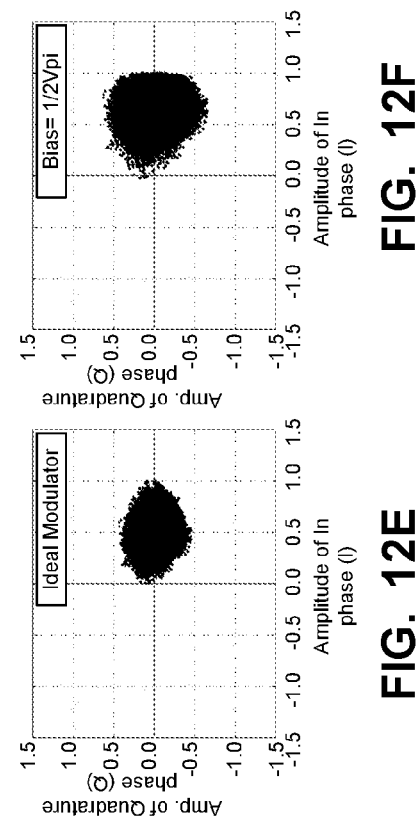
FIG. 12E  FIG. 12F  FIG. 12G  FIG. 12H

INTENSITY MODULATED DIRECT DETECTION OPTICAL TRANSCEIVER

TECHNICAL FIELD

The current application relates to optical transmitters and receivers and in particular to an intensity modulated direct detection optical transmission and reception system capable of longer transmission distances.

BACKGROUND

Intensity modulated direct detection (IMDD) with 4 level pulse amplitude modulation (PAM-4) has been adopted as a standard for high speed short reach 400 Gbps Ethernet applications. IMDD PAM-4 can be used over a single mode fiber at 56 Gbps for reaches from 2 km to 10 km. However, if the required transmission length is extended beyond 10 km, chromatic dispersion becomes a limiting factor.

It is desirable to extend the transmission distance of IMDD PAM signals.

SUMMARY

In accordance with the present disclosure there is provided an optical transmitter system comprising: a transmission digital processor outputting a digital transmission signal encoding data using Pulse Amplitude Modulation (PAM); a driving component for converting the digital transmission signal into an analog transmission driving signal; and an optical modulator producing an optical transmission signal based on the analog transmission driving signal, the optical modulator modulating the optical transmission signal in an approximately linear region of an amplitude transfer function of the optical modulator corresponding to a non-linear region of a power transfer function of the optical modulator.

In an embodiment of the optical transmitter system, the transmission digital processor receives a PAM symbol stream and generates the digital transmission signal by applying pre-compensation to the PAM symbol stream to compensate for chromatic dispersion resulting from an optical fiber used in transmitting the optical transmission signal.

In an embodiment of the optical transmitter system, the pre-compensation comprises one or more pre-compensation functions combined together, the pre-compensation functions comprising one or more of: a non-linear look-up-table (NL-LUT) for adjusting amplitude levels of PAM symbols of the PAM symbol stream to compensate for non-linear distortions resulting from operating the optical modulator in the non-linear region of the power transfer function; pulse shaping for adjusting a resulting spectral shape of the optical transmission signal; dispersion pre-compensation for adjusting the resulting optical transmission signal to compensate for chromatic dispersion; and DAC and driver pre-compensation for adjusting the resulting optical transmission signal to compensate for characteristics of the driving component.

In a further embodiment of the optical transmitter system, one or more of the pulse shaping functionality, dispersion pre-compensation functionality and DAC and driver pre-compensation functionality are combined together into a single linear pre-compensation function.

In a further embodiment of the optical transmitter system, the transmission processor up-samples the adjusted PAM symbol stream output from the NL-LUT prior to the linear pre-compensation function.

In a further embodiment of the optical transmitter system, the NL-LUT is generated during an initialization stage of the optical transmitter system.

In a further embodiment of the optical transmitter system, the NL-LUT compensates for an average symbol offset between desired PAM symbol levels and actual PAM symbol levels measured at an output of the optical modulator during the initialization stage.

In a further embodiment of the optical transmitter system, the NL-LUT comprises a loop gain compensation component to control an amount of compensation applied.

In a further embodiment of the optical transmitter system, the loop gain compensation component is set based on a bit error ratio at a receiver of the optical transmission signal.

In a further embodiment of the optical transmitter system, the optical modulator is biased to operate around a bias voltage of about ¾ $V_\pi$, where $V_\pi$ is a voltage at which the optical modulator modulates an optical signal to a lowest intensity level.

In a further embodiment of the optical transmitter system, the bias voltage of the optical modulator is set based on a bit error ratio at a receiver of the optical transmission signal.

In a further embodiment of the optical transmitter system, the digital transmission signal encodes the data using n levels of pulse amplitudes, wherein n=2, 4, 8 or 16.

In a further embodiment, the optical transmitter system further comprises: an optical receiver coupled to the optical transmitter through a length of fiber optic cable, the optical receiver comprising: an optical detector producing an electrical output corresponding to a detected optical signal; and a receiver processor for processing the electrical output of the optical detector to generate a symbol stream transmitted in the detected optical signal including a decision threshold look-up-table (DT-LUT) associating a range of values with a symbol, the DT-LUT being adaptively updated based on measured average symbol amplitudes.

In a further embodiment of the optical transmitter system, the optical transmitter system is capable of transmitting data at rates of greater than 50 Gbps with a bit error ratio of less than $10^{-3}$ over the length of fiber optic cable for lengths up 250 km.

In accordance with the present disclosure there is provided a method of transmitting data over an optical fibre comprising: encoding the data using Pulse Amplitude Modulation (PAM) to provide a symbol stream; processing the symbol stream to generate a modulator driving signal; and modulating an optical signal according to the modulator driving signal using an optical modulator operating in an approximately linear region of an amplitude transfer function of the optical modulator corresponding to a non-linear region of a power transfer function of the optical modulator.

In an embodiment, the method further comprises: transmitting the modulated optical signal over a length of fiber optic cable; detecting the modulated optical signal at a receiver to generate an electrical signal corresponding to the detected modulated optical signal; and determining symbols present in the electrical signal to re-construct the transmitted symbol stream.

In a further embodiment of the method, determining the symbols present in the electrical signal uses an adaptive decision threshold look-up-table providing a range of values associated with different symbols.

In a further embodiment of the method, the processing of the symbol stream comprises adjusting the symbol stream to compensate for chromatic dispersion of the modulated optical signal transmitted over the length of the fiber optic cable In a further embodiment of the method, the processing of the symbol stream comprises adjusting the symbol stream according to a non-linear look-up-table compensating for non-linear distortions resulting from operating the optical modulator in the non-linear region of the power transfer function.

In a further embodiment of the method, the method is cable of transmitting data at rates of greater than 50 Gbps with a bit error ratio of less than $10^{-3}$ over the length of fiber optic cable for lengths up 250 km.

BRIEF DESCRIPTION OF THE DRAWINGS

Embodiments are described herein with reference to the appended drawings, in which:

FIGS. 12A-12H are plots of signal coverage for different transmissions using dispersion pre-compensation.

DETAILED DESCRIPTION

The transmission of data over an optical fiber may use intensity modulated direct detection (IMDD) of a pulse amplitude modulated (PAM) data signal. The pulse amplitude modulation encodes a bit stream of data into a symbol stream, with each symbol associated with a different amplitude. Although different numbers of PAM symbol levels may be used, the following is described with regard to PAM-4 which uses 4 different amplitude levels for encoding data. IMDD PAM-n, and in particular PAM-4, can provide a relatively inexpensive transmission system; however, chromatic dispersion can limit the distance the IMDD PAM signal can be reliably transmitted. For example, without the use of dispersion compensation techniques an IMDD PAM-n system may be limited to approximately 10 km at a data rate of 56 Gbps. In order to increase the transmission distance, the chromatic dispersion may be compensated for, either prior to transmitting the signals, during transmission within the fibre optic cable, after receiving the transmitted signals, or combinations thereof. An efficient optical transmission system is described further below that biases an optical modulator to operate in a non-linear region of a power transfer function of the modulator. Although operating the optical modulator in a non-linear region of the power transfer function can introduce undesirable non-linear effects, it may also correspond to operating the optical modulator in a linear region of an amplitude transfer function of the modulator. By operating the modulator in the linear region of the amplitude transfer function, the dispersion pre-compensation may be more effective. The transmission system described further below may extend the transmission distance of an IMDD PAM-4 system up to 250 km or more depending upon acceptable bit error ratios.

Figure 1:
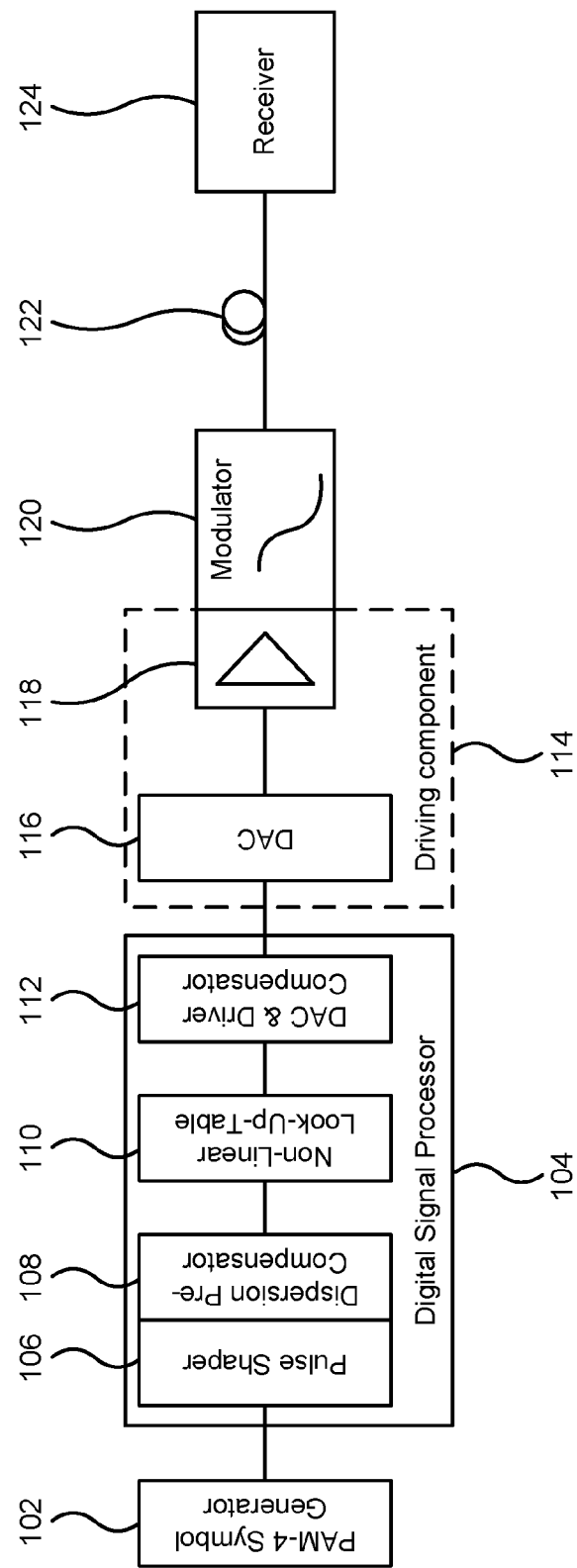
FIG. 1 depicts a conventional IMDD PAM-n optical transmitter and receiver with dispersion pre-compensation.

FIG. 1 depicts a conventional IMDD PAM-n optical transceiver system 100 with dispersion pre-compensation. In FIG. 1, n=4, although other values of n are possible. The transceiver system 100 comprises a PAM-4 symbol generator 102 that receives a bit stream of data to be transmitted and outputs a corresponding symbol stream. For PAM-4, each symbol may represent two bits as one of four possible pulse amplitudes. The symbol stream output by the symbol generator 102 may be processed by a digital signal processor (DSP) 104 that provides a processing chain that receives the symbol stream and generates a digital signal for conversion to an analog transmission signal to be transmitted over the fiber optic cable. The processing chain provided by the DSP 104 may provide various functionalities; however, the processing chain depicted in FIG. 1 includes a pulse shaper 106 that shapes the digital signal in order to provide a desired spectral shape to the resultant analog signal. The pulse shaping may include up-sampling the received symbol stream in order to provide the desired or required signal resolution when performing the digital signal processing. The processing chain may also include a dispersion pre-compensator 108. The dispersion pre-compensator 108 can adjust the digital signal corresponding to the symbol stream in order to compensate for the chromatic dispersion introduced by a fiber optic cable 122. The pulse shaper 106 and dispersion pre-compensator 108 may be combined together into a single DSP functional block that processes the symbol stream in order to compensate for non-ideal characteristics of the fibre optic cable 122.

The processing chain provided by the DSP 104 may further include a non-linear look-up-table (NL-LUT) 110 that adjusts the digital signal from the dispersion pre-compensator 108 to adjust for non-linear characteristics of the optical modulator. The processing chain may further comprise a digital to analog converter (DAC) and driver compensator 112 for adjusting the digital signal from the NL-LUT 110 to account for characteristics of the DAC and radio frequency (RF) drivers. Although the processing chain comprises three back-to-back compensators 108, 110, 112, it can be difficult to combine them together due to the non-linear nature of the middle NL-LUT 110. Further, since the pulse shaper 106, which is the first compensation stage, may up-sample the symbol stream all of the compensation components in the processing chain may be required to operate at the higher up-sampled data rate.

The digital signal output from the processing chain is converted into an analog transmission signal by a driving component 114 that converts the digital signal into an analog transmission signal suitable for use in modulating an optical signal. The driving component 114 may be provided by a digital to analog converter (DAC) 116 that converts the digital signal to an analog signal and an RF driver 118 that amplifies the analog signal to appropriate driving levels. The analog signal is amplified by the RF driver 118 and the amplified analog signal is used to control an electro-optic modulator 120 that modulates an amplitude of an optical carrier. The modulated optical carrier is transmitted over a fiber optic cable 122. The optical carrier may be provided by a laser or other similar optical source, which is not shown. The modulator 120 may be, for example, a Mach-Zehnder (MZ) modulator. The modulated optical signal output by the modulator 120 is carried over the fiber optic cable 122 and detected by a receiver 124, for example using a PIN photodiode detector or an avalanche photodiode (APD) detector. The detected optical signal is converted into a corresponding electrical signal that can be processed in order to re-construct the symbol stream.

The intensity of the modulated optical signal depends upon the intensity of the optical carrier signal being used and the voltage applied to the modulator. It is assumed that the intensity of the optical carrier signal is constant. Accordingly, the intensity of the optical signal output of the modulator depends upon the voltage applied to the modulator. As the applied voltage increases, the intensity of the modulated signal may decrease or increase depending on the bias point in the power transfer function. In the following description $V_\pi$ is the voltage at which the modulator provides a transition from the highest to the lowest intensity. It is noted that a practical optical modulator may not be able to provide a modulated output having absolute zero intensity. The power transfer function of the optical modulator has a non-linear profile; however, the modulator may be biased in order to operate in a linear, or approximately linear, region of the power transfer function. Although the modulator may operate in a linear region, the power transfer function may not be completely linear over the entire operating range and as such, the non-linear pre-compensation provided by the NL-LUT may be desirable. Although biasing the modulator to operate in a linear region may reduce non-linear effects on the transmitted signal, there are benefits to biasing the modulator to operate in a non-linear region at a lower bias point on the power transfer function.

Figure 2:
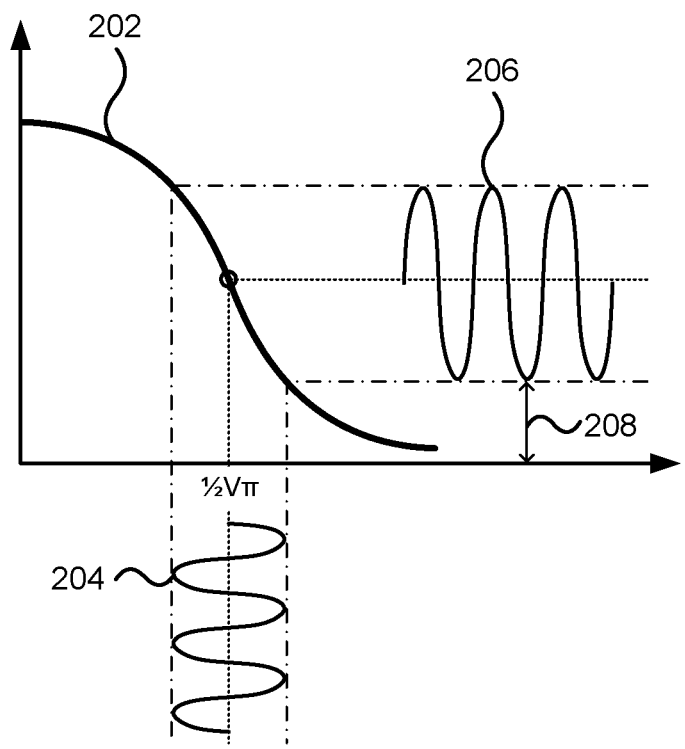
FIG. 2 depicts an operating bias point on a power transfer function of an optical modulator.

FIG. 2 depicts an operating bias point on a power transfer function of an optical modulator. As depicted, the optical modulator has a non-linear power transfer function 202. The power transfer function 202 depicted in FIG. 2 corresponds to a power transfer function of a Mach-Zehnder type of an optical modulator. It should be understood that different types of modulators may have different power transfer functions. For an input voltage between 0 volts and $V_\pi$ volts, the optical modulator will modulate the intensity of the carrier optical signal as depicted by the graph of FIG. 2. The modulator may be biased to operate in a linear, or approximately linear, region of the power transfer function 202. To operate in the linear region, the modulator may be biased by a direct current (DC) voltage of approximately ½ $V_\pi$. If an input electric signal 204 is limited in its amplitude to remain in within the linear region around the bias point, the electric signal 204 will be modulated according to the linear region of the power transfer function, and a resulting modulated output optical signal 206 will correspond to the input electric signal controlling the modulator.

Biasing the modulator to operate in the linear region of the power transfer function may require a large RF driving voltage in order to increase the extinction ratio of the output optical signal 206. However, providing the large RF driving voltages requires an RF amplifier with sufficiently high gain. If the gain of the RF amplifier providing the RF driving voltage is not sufficiently high, the lowest intensity 208, or zero-intensity level, of the optical signal 206 is increased. This increased zero-intensity level of the optical signal 206 results in a poor extinction ratio (ER). In addition, it may increase a beating noise term at the receiver and reduce the received signal power after the DC component is removed. As a result, the signal to noise ratio (SNR) will be decreased at the receiver. As transmission distances increase, the increased zero-intensity level may quickly degrade the IMDD signal in a dispersion pre-compensated system, limiting the maximum transmission distance.

Figure 3:
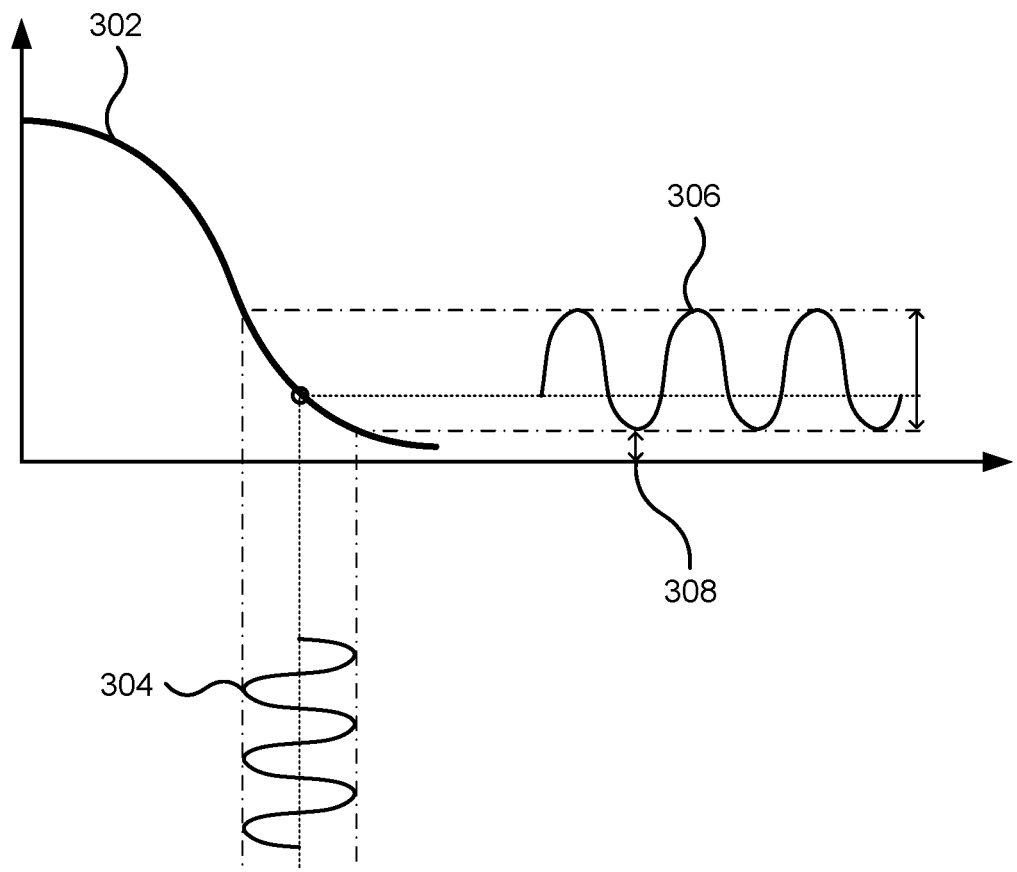
FIG. 3 depicts a further operating bias point on a power transfer function of an optical modulator.

FIG. 3 depicts a second operating bias point on a power transfer function of an optical modulator. By adjusting the modulator to operate at a lower bias point on a power transfer function 302, which may occur at a voltage of, for example, approximately ¾ $V_\pi$, the required RF driving voltage may be decreased to achieve an acceptable ER for an input signal 304. The decreased bias point on the power transfer function results in a lower zero-intensity level 308 of the optical signal, which may increase ER in an optical signal 306. This may also reduce a beating noise term and increase SNR at the receiver, which in turn allows an increase in the transmission distance.

Although the transmission distance may be increased, the output optical signal 306 no longer corresponds to the driving signal 304 due to the non-linear region of the power transfer function the modulator is operating in. These non-linear characteristics of the modulator biased at a higher bias voltage, resulting in a lower bias point in the power transfer function, may be compensated for using the non-linear look-up-table. Although the modulator may be biased to be operated in a non-linear region of the power transfer function, the bias point corresponds to a linear region of the amplitude transfer function. Dispersion pre-compensation will be performed on the amplitude of the signal and as such, the dispersion pre-compensation may be more efficient when the modulator is biased to operate in the linear region of the amplitude transfer function which corresponds to the non-linear region of the power transfer function.

Figure 4:
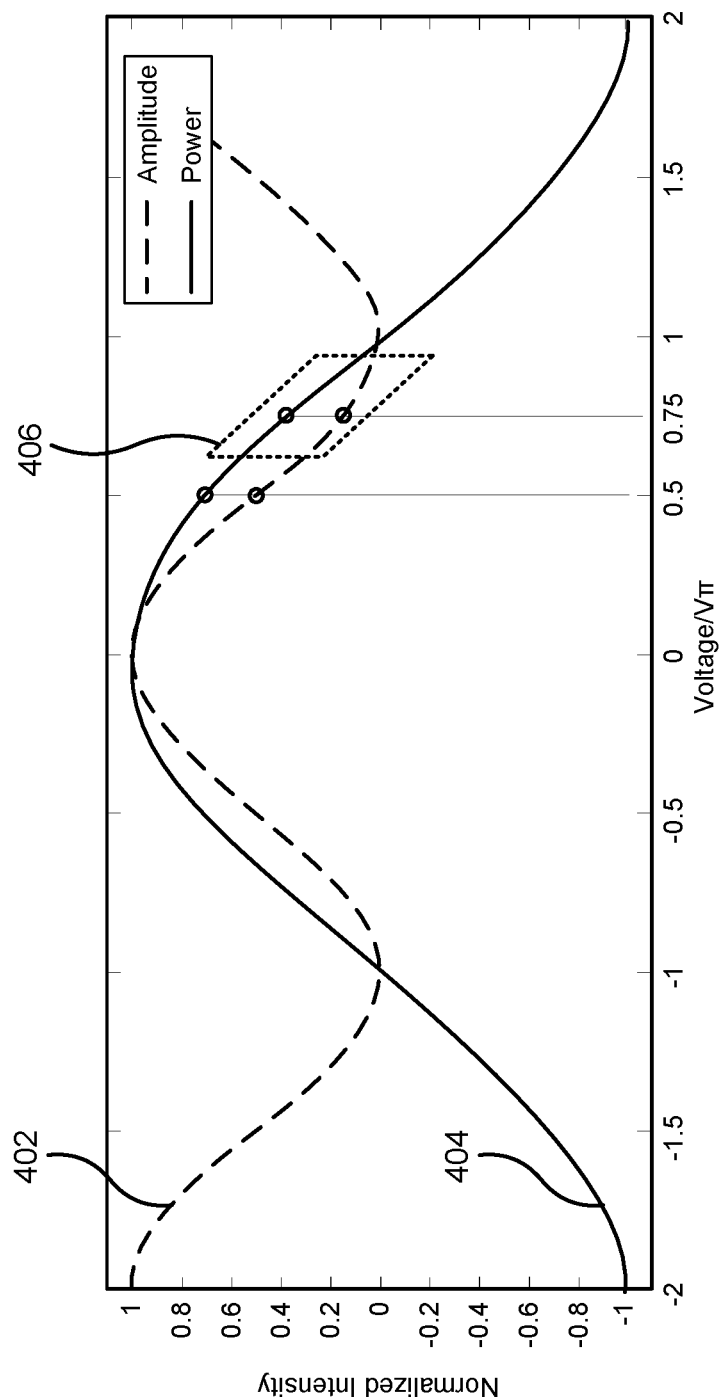
FIG. 4 depicts an amplitude transfer function and a power transfer function of an optical modulator.

FIG. 4 depicts a power transfer function 402 and an amplitude transfer function 404 of an example optical modulator. The power and amplitude transfer functions 402, 404 depicted in FIG. 4 are for a lithium niobate Mach-Zehnder type optical modulator; however, it should be understood that different types of modulators may have different amplitude and power transfer functions, although the general shapes may be similar. As can be seen, although lowering the bias point along the power transfer function, by raising the normalized bias voltage from 0.5 to 0.75, causes the modulator to operate in a non-linear region 406 of the power transfer function 402, the lower bias point corresponds to operating in a linear, or approximately linear, region 406 of the amplitude transfer function 404. Although the normalized voltage is described as being raised to 0.75, it may be raised from 0.5 to a range about 0.75, such as between approximately 0.6 to approximately 0.9.

Figure 5:
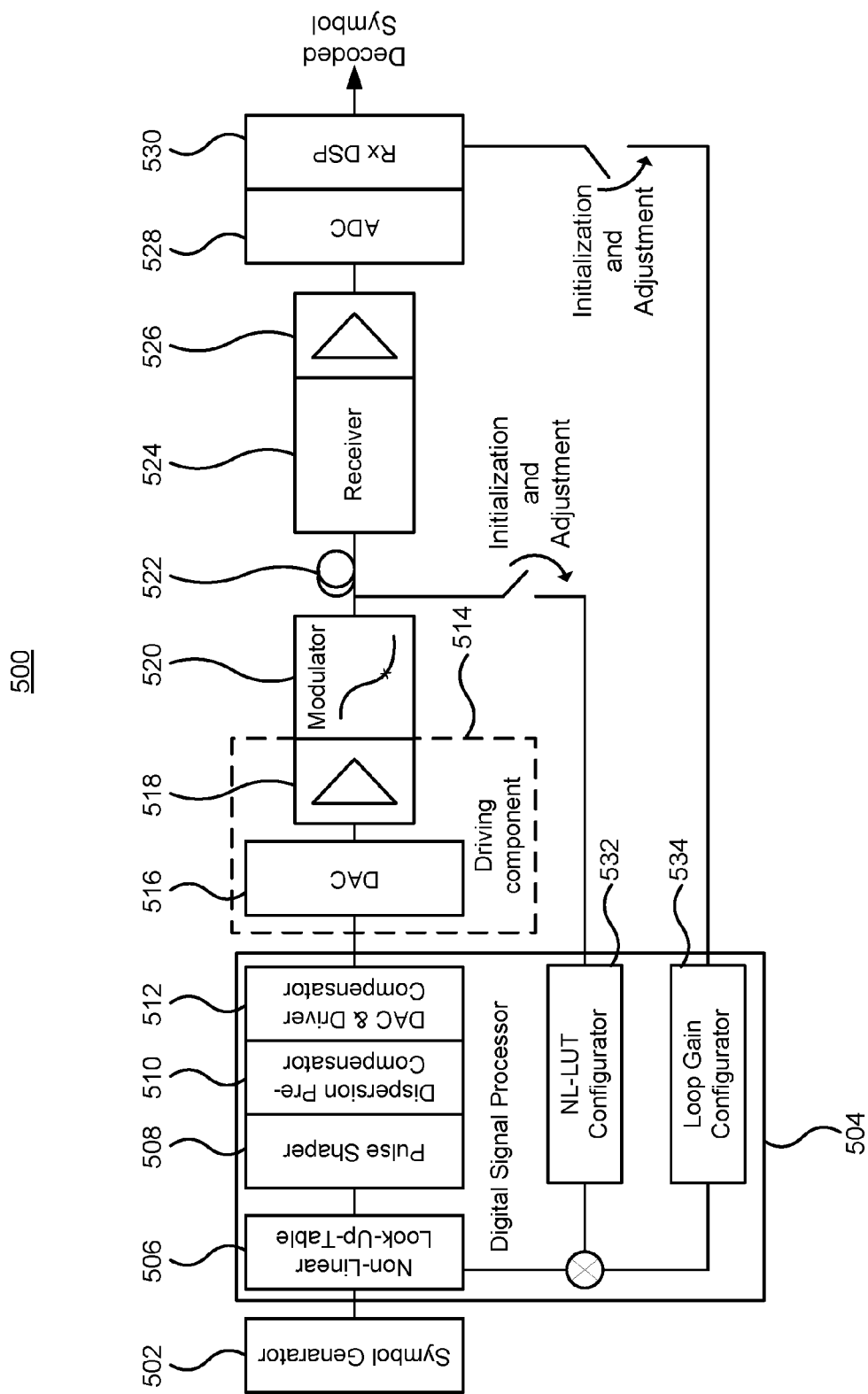
FIG. 5 depicts an IMDD PAM-n optical transmitter and receiver with dispersion pre-compensation for an optical modulator having a low bias point and non-linear compensation based on a look-up-table.

FIG. 5 depicts an IMDD PAM-4 optical transmitter and receiver system 500 with dispersion pre-compensation for an optical modulator having a low bias point on a power transfer function of the modulator. The system 500 comprises a PAM-4 symbol generator 502 that receives a bit stream and generates a corresponding symbol stream encoding the bit streams as a symbol stream of symbols having different amplitudes. The symbol stream is processed by a digital signal processor (DSP) 504 in order to provide a digital signal corresponding to the symbol stream. The digital signal is converted to an analog signal by a driving component 514 and is used to control an optical modulator 520 that is biased with a bias voltage approximately at ¾$V_\pi$ in order to operate in an approximately linear region of an amplitude transfer function of the optical modulator 520, which corresponds to a non-linear region of a power transfer function of the optical modulator 520.

The DSP 504 provides a processing chain that processes a digital signal in order to compensate for chromatic dispersion, as well as other non-ideal, or undesirable, characteristics of the components in the transmitter. The processing chain may receive a symbol stream from the symbol generator 502, which is processed according to a NL-LUT 506. The values used by the NL-LUT 506 to associate each of the modulated symbol amplitude levels with a corresponding adjusted symbol amplitude. The NL-LUT 506 adjusts the digital signal in order to compensate for operating the modulator in the non-linear power transfer region. The NL-LUT 506 can operate at the same rate as the symbol rate and as such, the symbol stream does not need to be upsampled prior to processing by the NL-LUT 506, which reduces complexity and power consumption as opposed to having the NL-LUT in the middle of DSP chains.

The digital signal corresponding to the adjusted symbol stream may be processed by a pulse shaper 508, a dispersion pre-compensator 510, as well as a DAC and driver compensator 512. The pulse shaper 508 may up-sample the digital signal in order to provide adequate resolution for digital signal processing. The pulse shaper 508 processes the digital signal in order to confine the spectral content within the desired bandwidth. The dispersion pre-compensator 510 provides dispersion pre-compensation to the digital signal in order to compensate for chromatic dispersion of the fiber optic cable. The dispersion pre-compensation may be achieved in various ways. For example, the dispersion pre-compensation may be provided by a finite impulse response (FIR) filter in the time domain or by calculating an inverse of the transfer function in the frequency domain. The processing chain may also comprise the DAC and driver compensator 512 that processes the digital signal in order to compensate for the characteristics of the driving component 514.

Although depicted separately, the pulse shaper 508 and compensators 510, 512 may be combined together into a single compensation process. The digital signal resulting from the processed symbol stream is converted to an analog signal and amplified to an appropriate level for controlling the optical modulator 520 by the driving component 514. The driving component 514 may comprise a digital to analog converter (DAC) 516 and an RF driver 518. The analog output of the DAC 516 is amplified by the RF driver 518 and used to control the optical modulator 520. As described above, the optical modulator 520 may be biased to operate at a lower bias point in a non-linear region of the power transfer function, which corresponds to operating in an approximately linear region of the amplitude transfer function. The modulator 520 modulates an optical carrier signal according to the analog electrical signal corresponding to the processed symbol stream. The modulated optical signal is transmitted from the modulator 520 over a fiber optic link 522. The fiber optic link 522 may be provided by a length of fiber optic cable. The link may include a plurality of sections of fiber optic cable joined together by one or more optical amplifiers. The intensity of the transmitted optical signal is detected and converted to an electrical signal by a receiver 524, which may employ, for example, a PIN photodiode detector or an APD detector. The electrical signal is amplified by an amplifier, such as a transimpedance amplifier 526, and is converted to a digital signal by an analog to digital converter (ADC) 528. The digital signal is processed by a receiver DSP 530 to recreate the symbol stream.

As described above, the symbols may be adjusted according to the NL-LUT 506 in order to compensate for the non-linear operation of the modulator. The values used by the NL-LUT 506 in adjusting symbol levels may be generated to compensate for an average symbol offset resulting from operating the modulator in the non-linear region of the power transfer function. During an initialization phase, the values for the NL-LUT may be generated by a NL-LUT configurator 532 of the DSP 504 by measuring an average symbol offset at the output of the transmitter. The NL-LUT values may then be generated to compensate for the measured average symbol offsets. The initialization phase may transmit a number of samples of the different symbols in order to reliably measure the average symbol offsets. The NL-LUT values are generated during the initialization phase and may remain static during operation. Although described as an initialization stage, the NL-LUT values may be slowly updated periodically by performing the same process.

A loop gain, which controls an amount of non-linear compensation that is applied by the NL-LUT 504, may be determined during the initialization phase by a loop gain configurator process 534 may determine a loop gain to optimize the amount of compensation to apply. The loop gain compensation may be determined using a feedback from the receiver. The loop gain compensation and the NL-LUT values determined by the NL-LUT configurator process 534 may be combined together NL-LUT 504 to adjust the symbol stream during the normal operation of the transmitter. In alternative embodiments, the transmitter may operate without the use of feedback.

As an example, the measurements of the symbol amplitude offset and loop gain are depicted in the table below. The NL-LUT values for each of the symbols may be determined according to equation (1) below.

$$\text{NL-LUT} = (\text{Ideal Symbol Level}) + (\text{Loop Gain})(\text{Amplitude Offset}) \quad (1)$$

TABLE 1

Table depicting NL-LUT measurements

| Ideal Symbol Level | Avg. Transmitted Symbol Level | Amplitude Offset | Loop Gain | NL-LUT Value |
|---|---|---|---|---|
| +3 | +2.76 | +0.24 | 0.6 | +3.1440 |
| +1 | +1.23 | −0.23 | | +0.8620 |
| −1 | −0.81 | −0.19 | | −1.140 |
| −3 | −2.78 | −0.22 | | −3.132 |

Figure 6:
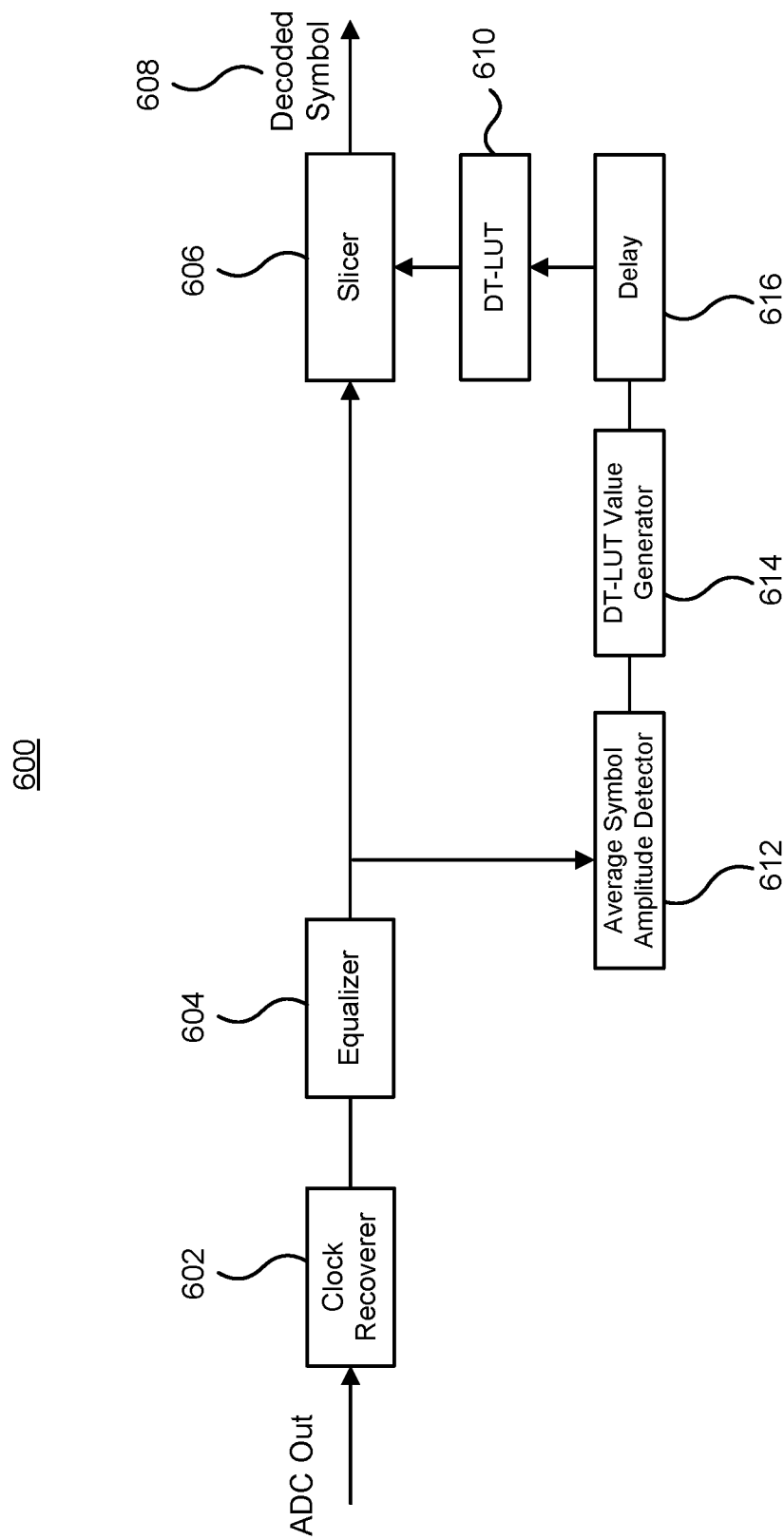
FIG. 6 depicts components of a digital signal processing (DSP) block having adaptive decision threshold LUT in a receiver.

FIG. 6 depicts details of a receiver using an adaptive decision threshold (DT) LUT process in a DSP block of a receiver. Receiver DSP 600 may be used as a part of the receiver DSP 530 described above with reference to FIG. 5. The DSP block receives a digital signal from the analog to digital converter. A clock recoverer 602 processes the received digital signal in order to recover the timing, which is used in identifying the symbols within the received signal. The digital signal is processed by an equalizer 604 that equalizes the digital signal, for example by normalizing a power of the signal, removing inter-symbol interference, etc. A slicer process 606 processes the digital signal in order to make a decision on the symbols present. The slicer 606 generates the decoded symbol stream 608 using an adaptive DT-LUT 610. The adaptive DT-LUT 610 provides decision threshold values associated with each of the possible symbols. If the digital output value is within a particular range, the symbol decision is made with the particular range and the decoded symbol is output from the slicer 606 to the symbol stream 608.

The adaptive DT-LUT 610 is adapted based on the received digital output in order to adapt to varying symbol levels, which may vary slowly based on factors, such as temperature change, bias drift or other factors. The DT-LUT 610 may be slowly updated by measuring the average symbol amplitudes over a period of time and updating the DT-LUT 610 based on the average symbol amplitudes. An average symbol amplitude detector 612 determines the actual amplitude levels associated with decoded symbols and averages the amplitude values over a period of time, or for a number of symbols. The determined average symbol amplitudes are used by a DT-LUT value generator 614 to generate updated values for the DT-LUT 610 corresponding to symbol ranges. The updated DT-LUT values may be delayed by a delay 616 prior to updating the DT-LUT 610 used by the slicer 608.

As the amplitudes of the transmitted signals slowly vary, the adaptive process updates the values of the DT-LUT 610 used by the slicer 608. The adaptive DT-LUT 610 may be used to decode PAM-4 symbols that are non-equally spaced, as may be the case for a modulator operating in a non-linear region of the power transfer function. The adaptive updating process may allow the slicer 606 to tolerate small amount of bias drift. Applying the adaptive DT-LUT 610 by the slicer 606 allows the receiver DSP 600 to successfully decode non-equally spaced and slowly varying symbols, which in turn may simplify the automatic bias control for IMDD PAM-4 at the transmitter. The IMDD transceiver is optimized for dispersion pre-compensation to increase the transmission distance of the PAM-4 signal. When the transmission system is dispersion limited, as in the case of long range transmission of up to 250 km for example, the system described above can extend the transmission range for the IMDD PAM-4 system.

Although described as using PAM-4, the systems described above, may be applied to other types of pulse amplitude modulation, referred to broadly as PAM-n. By optimizing the transmitter for dispersion pre-compensation, the transmission distance of the system may be extended. It is possible to provide a 56 Gbps PAM-4 optical transmission system that can transmit data at distances of approximately 250 km with a BER threshold of $10^{-3}$.

Figure 7:
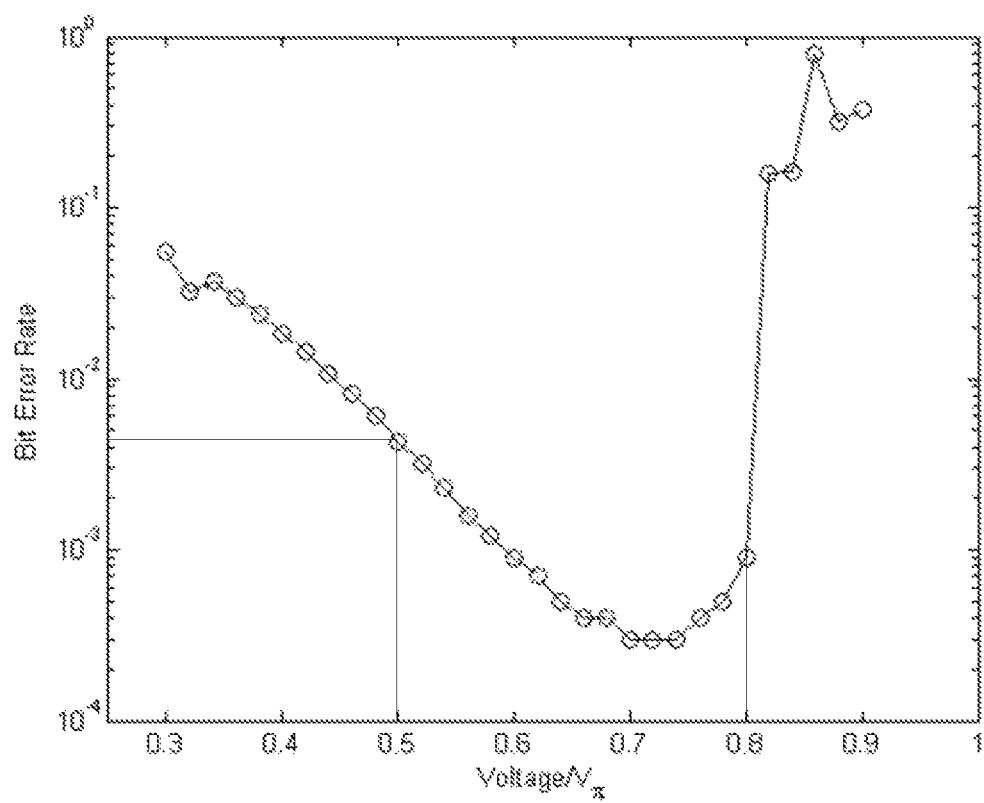
FIG. 7 depicts a graph of the simulated dependency of the bit error rate on the normalized bias voltage after 200 km.

FIG. 7 depicts a simulated graph of the dependency of the bit error rate on the normalized bias voltage after 200 km. It can be seen that the bit error rate (BER) decreases to a minimum of below $10^{-3}$ at a normalized bias voltage of between 0.70 and 0.75, which corresponds to a bias voltage of approximately $\frac{3}{4} V_\pi$. As the bias voltage varies outside the minimum region, the BER begins to sharply increase, in particular when the bias voltage increases past approximately $0.8 V_\pi$. It should be understood that, due to the periodicity of the amplitude and power transfer functions as seen in FIG. 4, a similar relationship should be expected in other bias voltage ranges.

As can be seen from FIG. 7, increasing the bias voltage from $\frac{1}{2} V_\pi$ reduces the BER. Increasing the bias voltage may increase the linearity of the amplitude transfer function, which may increase the efficiency of the pre-compensation of the dispersion as dispersion pre-compensation is applied to the amplitude and as such may be most efficient when the amplitude transfer function is linear. The lowering of the bias point along the power transfer function may also result in a decrease in the zero-intensity level of the output signal, increasing ER, reducing the beating noise term, and increasing SNR at the receiver. Although lowering the bias point may increase the linearity of the amplitude transfer function, it may also increase the non-linearity of the power transfer function. The increased non-linearity in the power transfer function may be compensated for by using the non-linear look-up-table (NL-LUT) as described above.

Figure 8:
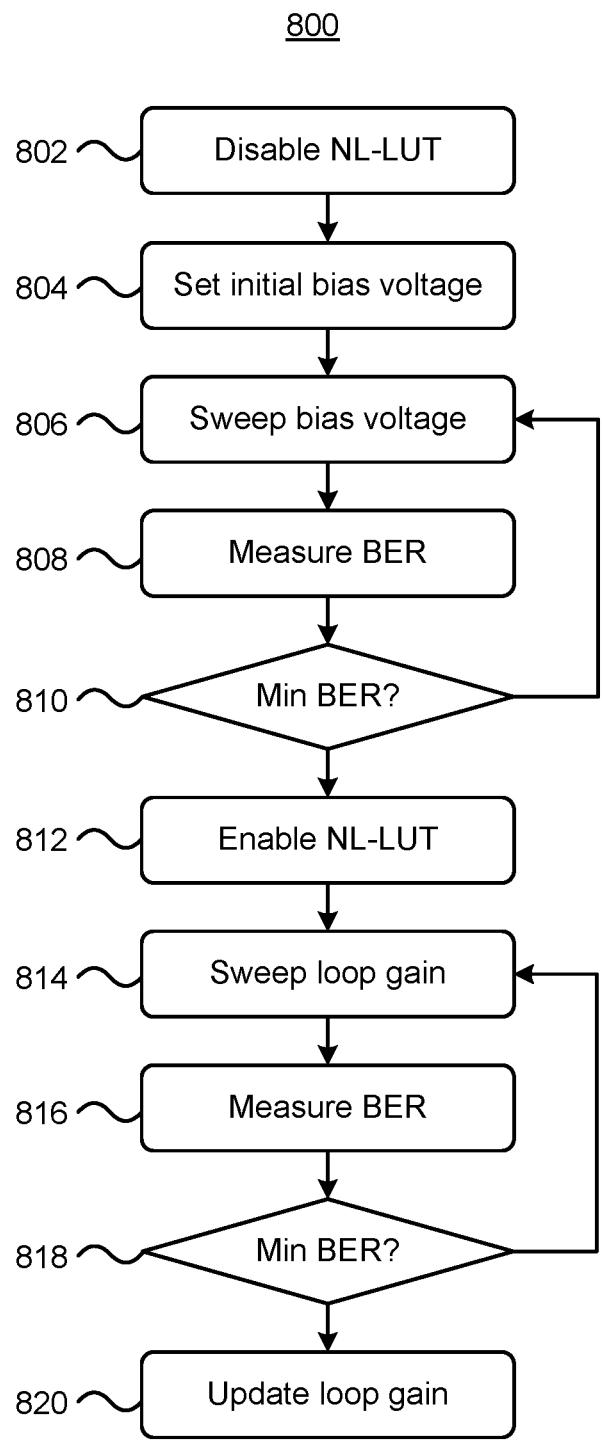
FIG. 8 depicts a method for initializing an optical transmitter system.

FIG. 8 depicts a method 800 for initializing an optical transmitter system, such as the optical transmitter system of FIG. 5. The method 800 begins with disabling the NL-LUT processing at a step 802 and sets the initial bias point of the modulator at a step 804. The initial bias voltage may be set to provide ¼ of an peak intensity level of approximately $$I_{bias} = \frac{1}{4} E_0^2,$$

where $E_0$ denotes the peak amplitude of an optical signal. The required bias voltage may be determined according to:

$$V_{bias} = \frac{V_\pi}{\pi} \cos^{-1}\left(\frac{2 I_{bias}}{E_0^2} - 1\right) \quad (2)$$

Once the initial bias voltage is set, the voltage is swept at a step 806, for example by increasing the voltage in small increments. As the bias voltage is swept, the bit error rate (BER) at the receiver is measured at a step 808. It is determined whether the BER is at a minimum at a step 810, which may be done by comparing the measured BER to the previously measured BER to determine if the BER is decreasing or increasing. If the measured BER is at a minimum, or the BER rate begins to increase, (Yes at step 810), the sweeping of the bias voltage stops and the modulator remains biased at the set bias voltage. If the BER is not a minimum (No at step 810), the bias voltage continues to be swept in order to locate the bias voltage that provides the best, or lowest, BER. Once the bias point is set, the loop gain may be set. The NL-LUT functionality is enabled at a step 812 and values for the loop gain are swept at a step 814. As the loop gain is swept the BER is measured at a step 816 and the minimum BER is determined at a step 818. Once the minimum BER is determined (Yes at step 818) the loop gain value associated with the minimum BER is used in updating the loop gain at a step 820 used by the NL-LUT.

Figure 9:
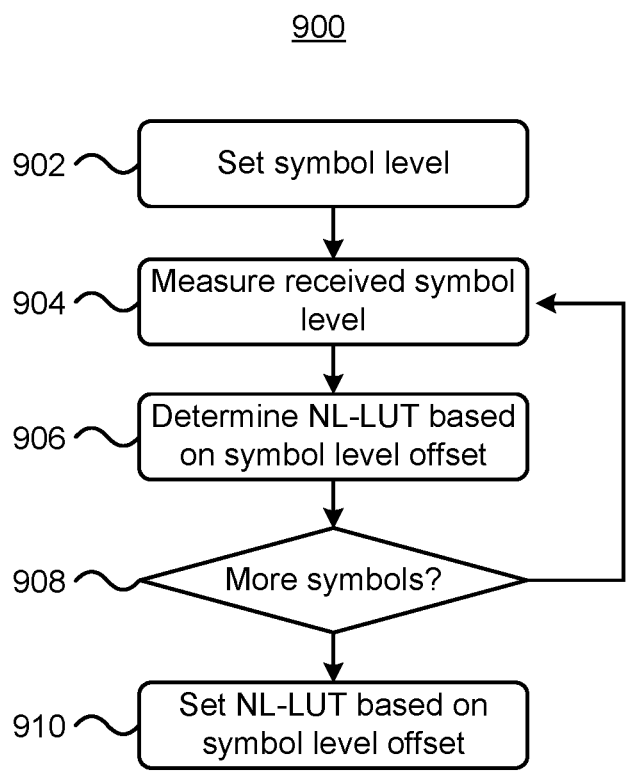
FIG. 9 depicts a method for initializing a non-linear look-up-table of an optical transmitter system.

FIG. 9 depicts a method 900 for initializing a non-linear look-up-table of an optical transmitter system. The method 900 sets an initial symbol level at a step 902 for the default symbols, for example −3, −1, +1, +3 for a PAM-4, and measures a transmitted symbol level at a step 904 for each of the symbols. Alternatively, rather than measuring the transmitted symbol level, the method may measure a received symbol level. The method 900 may measure a number of transmitted symbols having the same level in order to provide an average symbol level. The NL-LUT value for the symbol level is determined according to the offset between the set symbol level and the measured symbol level at a step 906. The method determines if there are more symbols to compute at a step 908 and if there are (Yes at step 908), the process repeats for the next symbol level at the step 904. If there are no more symbols left (No at step 908), the NL-LUT is set based on the determined symbol offsets at a step 910.

Figure 10A:
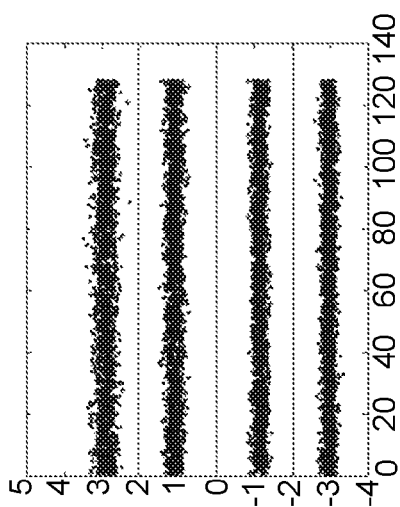
FIGS. 10A-10F are plots of received signals for different transmissions using dispersion pre-compensation.
Figure 10B:
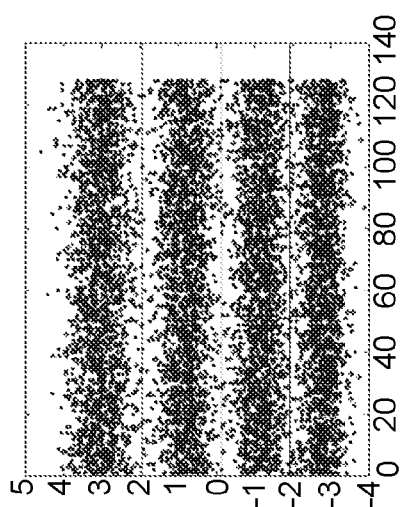
Figure 10C:
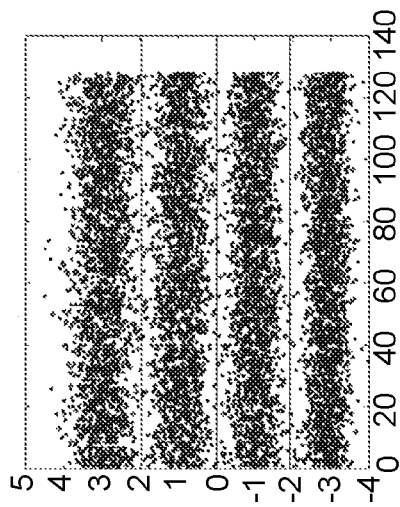

FIGS. 10A-10F are plots of received signals after DSP for different transmissions using dispersion pre-compensation. FIG. 10A depicts a transmission output received at 0 km from a transmitter having a modulator biased at ½ $V_\pi$. FIG. 10B depicts the transmission output received at 200 km from a transmitter having a modulator biased at ½ $V_\pi$, without using an NL-LUT. FIG. 10C depicts the transmission output received at 200 km from a transmitter having a modulator biased at ½ $V_\pi$, when an NL-LUT is employed.

Figure 10D:
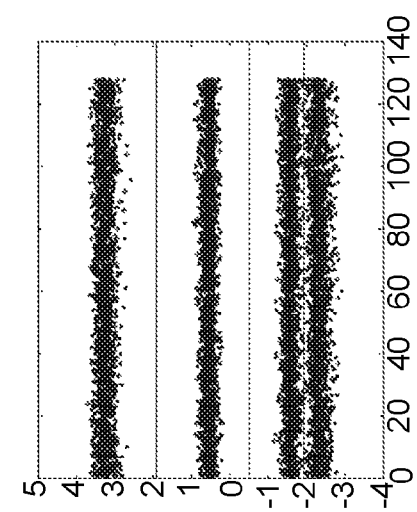
Figure 10E:
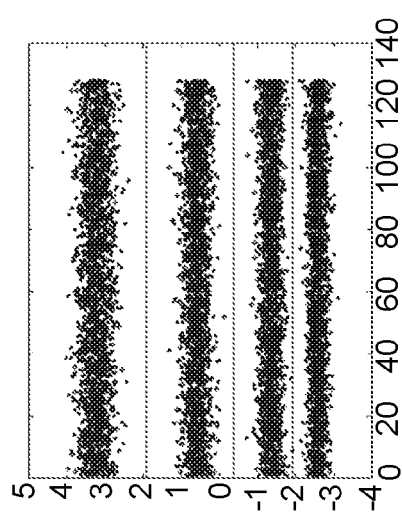
Figure 10F:
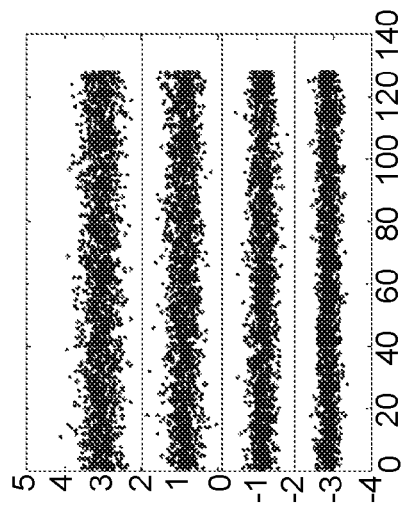

FIG. 10D depicts a transmission output received at 0 km from a transmitter having a modulator biased at ¾ $V_\pi$. As depicted, modulating the symbol stream at a lower biasing point results in the lower amplitude encodings being more closely spaced to each other than in the transmission output of FIG. 10A. FIG. 10E depicts the transmission output received at 200 km from a transmitter having a modulator biased at ¾ $V_\pi$, without applying an NL-LUT. As depicted, the received signal is not degraded as much, and the transmitted signal may be more easily recovered at the receiver than in the transmission output of FIG. 10B. As opposed to FIG. 10D, the bottom two symbol levels in FIG. 10E are slightly more separated. This was caused by the non-ideal characteristics of the dispersion pre-compensation block in the transmitter DSP. FIG. 10F depicts the transmission output received at 200 km from a transmitter having a modulator biased at ¾ $V_\pi$, when an NL-LUT is employed. Applying the NL-LUT further separates the output signals corresponding to the low-amplitude symbols, which improves the symbol detection.

Figure 11:
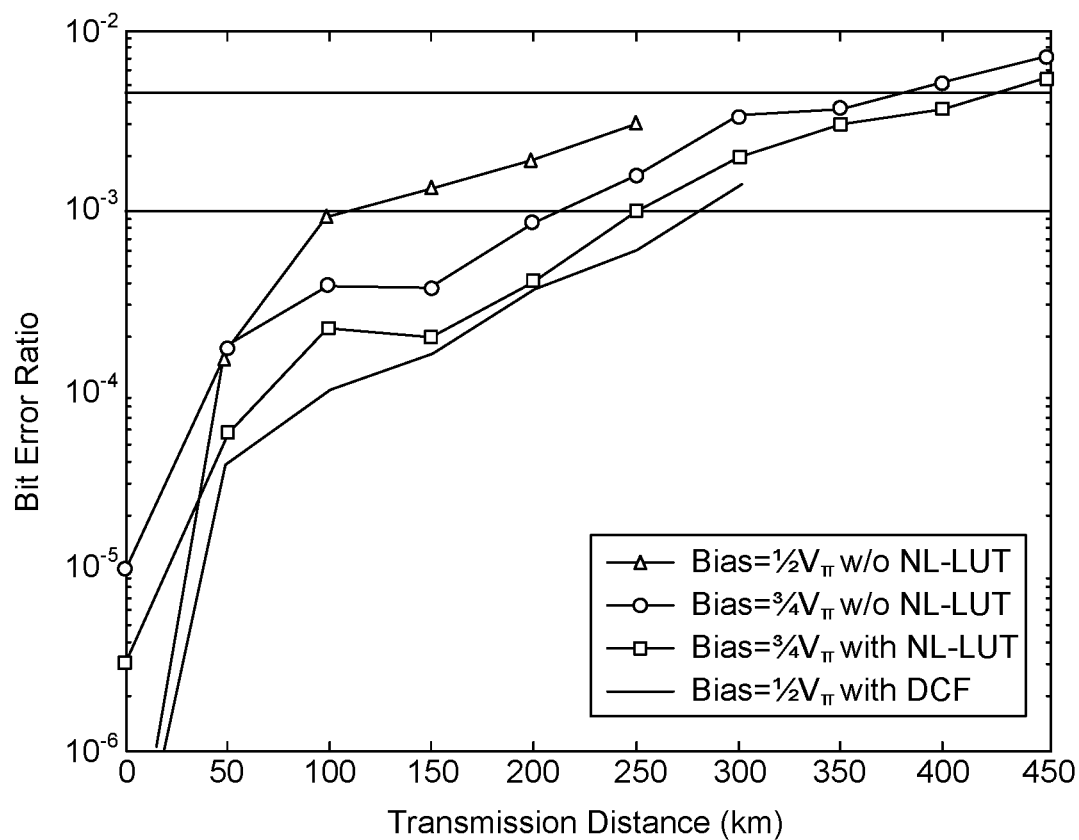
FIG. 11 is a graph of bit error rates vs. transmission distances for different bias voltages.

FIG. 11 is a graph of bit error rates vs. transmission distances for different bias voltages. Although different BERs may be considered acceptable in different applications, a BER threshold of $10^{-3}$ is often considered acceptable and used as a benchmark. As depicted in FIG. 11, if the IMDD PAM-4 transmitter utilizes a modulator that is operating at a bias voltage of ½ $V_\pi$, the BER increases above the acceptable level of $10^{-3}$ at a transmission distance of approximately 100 km. However, if the bias point is lowered along the power transfer function, for example, the bias voltage of ¾ $V_\pi$, the transmission distance may be extended to over 200 km while maintaining a BER below $10^{-3}$, even if a non-linear LUT is not used. If non-linear LUT compensation is applied to a transmitter biased at ¾ $V_\pi$ the transmission distance may be extended to approximately 250 km in this example. As a reference, the BER performance with a conventional dispersion compensating fiber (DCF) is also shown in FIG. 11, which has the longest transmission distance. However, using DCF may increase network cost and network planning may become more complex. If the acceptable BER is increased, for example, a BER threshold of $4.5 \times 10^{-3}$, the transmission distance may be extended up to 400 km or more.

FIGS. 12A-12H are plots of signal coverage in the complex plane for different transmissions using dispersion pre-compensation. As the signals had different output powers due to different operating conditions, they were normalized by root mean square (RMS) values for a comparison purpose. Then the mean square error was measured as opposed to that of the reference signal which used the ideal modulator (i.e. FIG. 12A for 0 km and FIG. 12E for 200 km). FIGS. 12A-12D depict signals received at a transmission distance of 0 km. FIG. 12A depicts the signal coverage in the complex plane for an ideal modulator at a transmission distance of 0 km. In the simulation, DAC and driver response were compensated and the symbol levels were spread over the entire real axis. FIG. 12B depicts the signal coverage in the complex plane for a modulator biased at ½ $V_\pi$ at a transmission distance of 0 km. The mean square error of the I channel associated with FIG. 12B is −14.5 dB. FIG. 12C depicts the signal coverage in the complex plane for a modulator biased at ½ $V\pi$, but at a reduced gain, at a transmission distance of 0 km. The mean square error of the I channel (i.e. real or X-axis) associated with FIG. 12C is −17.09 dB. FIG. 12D depicts the signal coverage in the complex plane for a modulator biased at ¾ $V_\pi$ at a transmission distance of 0 km. The mean square error of the I channel associated with FIG. 12D is −22.8 dB. FIGS. 12E-12H depict signals received at a transmission distance of 200 km. FIG. 12E depicts the signal coverage in the complex plane for an ideal modulator at a transmission distance of 200 km. FIG. 12F depicts the signal coverage in the complex plane for a modulator biased at ½ $V_\pi$ at a transmission distance of 200 km. The mean square error of the I channel associated with FIG. 12F is −16.35 dB. As can be seen from FIG. 12F, the gain setting causes signal clipping when dispersion pre-compensation is applied. FIG. 12G depicts the signal coverage in the complex plane for a modulator biased at ½ $V_\pi$, but at a reduced gain to avoid signal clipping, at a transmission distance of 200 km. The mean square error of the I channel associated with FIG. 12G is −17.01 dB. FIG. 12H depicts the signal coverage in the complex plane for a modulator biased at 0.75 $V_\pi$ at a transmission distance of 200 km. The mean square error of the I channel associated with FIG. 12H is −24.18 dB. As can be seen, FIG. 12H has the lowest mean square error which implies that the dispersion pre-compensation is applied more accurately when a modulator is biased at ¾ $V_\pi$.

Figure 13A:
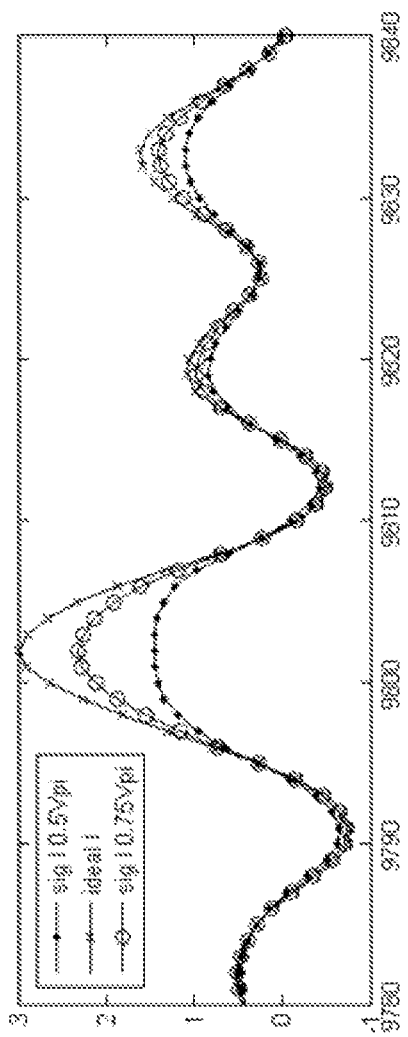
FIGS. 13A and 13B are plots of different transmitted signals in time domain.
Figure 13B:
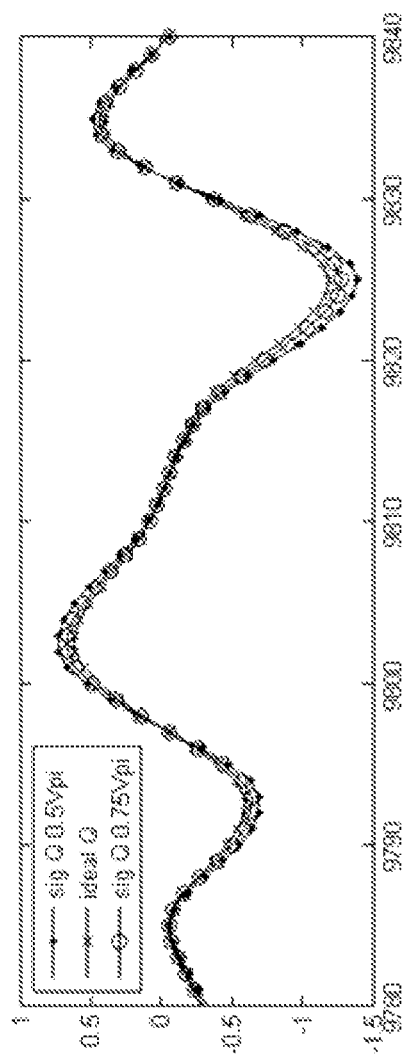

FIGS. 13A and 13B are time domain plots of different transmitted signals with dispersion pre-compensation for 200 km. FIG. 13A depicts the I channel and FIG. 13B depicts the Q channel (i.e. imaginary or Y-axis). The values have been normalized by the RMS value. In the FIGs., the I channel is biased at either ½ $V_\pi$ or at ¾ $V_\pi$ and the Q channel is all biased at $V_\pi$ which has the most linear amplitude transfer function. As depicted in FIG. 13B, the Q channels are similar for the ideal signal, the signal biased at ½ $V_\pi$ and the signal biased at ¾ $V_\pi$. As depicted in FIG. 13A, the I channel for the signal biased at ¾ $V_\pi$ is closer to the ideal signal when compared to the signal biased at ½ $V_\pi$.

The present disclosure provided, for the purposes of explanation, numerous specific embodiments, implementations, examples and details in order to provide a thorough understanding of the invention. It is apparent, however, that the embodiments may be practiced without all of the specific details or with an equivalent arrangement. In other instances, some well-known structures and devices are shown in block diagram form, or omitted, in order to avoid unnecessarily obscuring the embodiments of the invention. The description should in no way be limited to the illustrative implementations, drawings, and techniques illustrated, including the exemplary designs and implementations illustrated and described herein, but may be modified within the scope of the appended claims along with their full scope of equivalents.

While several embodiments have been provided in the present disclosure, it should be understood that the disclosed systems and components might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

What is claimed is:

1. An optical transmitter system comprising:
 a transmission digital processor for outputting a Pulse Amplitude Modulated (PAM) digital transmission signal;
 a driving component for converting the digital transmission signal into an analog transmission driving signal; and
 an optical modulator for producing an optical transmission signal based on the analog transmission driving signal by modulating the optical transmission signal in an approximately linear region of an amplitude transfer function of the optical modulator corresponding to a non-linear region of a power transfer function of the optical modulator.

2. The optical transmitter system of claim 1, wherein the transmission digital processor is configured for receiving a PAM symbol stream and generating the digital transmission signal by applying pre-compensation to the PAM symbol stream to compensate for chromatic dispersion of an optical fiber used in transmitting the optical transmission signal.

3. The optical transmitter system of claim 2, wherein the pre-compensation comprises one or more pre-compensation functions combined together, the pre-compensation functions comprising one or more of:
 a non-linear look-up-table (NL-LUT) for adjusting amplitude levels of PAM symbols of the PAM symbol stream to compensate for non-linear distortions resulting from operating the optical modulator in the non-linear region of the power transfer function;
 pulse shaping for adjusting a resulting spectral shape of the optical transmission signal;
 dispersion pre-compensation for adjusting the resulting optical transmission signal to compensate for chromatic dispersion; and
 DAC and driver pre-compensation for adjusting the resulting optical transmission signal to compensate for characteristics of the driving component.

4. The optical transmitter system of claim 3, wherein one or more of the pulse shaping functionality, dispersion pre-compensation functionality and DAC and driver pre-compensation functionality are combined together into a single linear pre-compensation function.

5. The optical transmitter system of claim 4, wherein the transmission processor up-samples the adjusted PAM symbol stream output from the NL-LUT prior to the linear pre-compensation function.

6. The optical transmitter system of claim 3, wherein the NL-LUT is generated during an initialization stage of the optical transmitter system.

7. The optical transmitter system of claim 6, wherein the NL-LUT compensates for an average symbol offset between desired PAM symbol levels and actual PAM symbol levels measured at an output of the optical modulator during the initialization stage.

8. The optical transmitter system of claim 3, wherein the NL-LUT comprises a loop gain compensation component to control an amount of compensation applied.

9. The optical transmitter system of claim 8, wherein the loop gain compensation component is set based on a bit error ratio at a receiver of the optical transmission signal.

10. The optical transmitter system of claim 1, wherein the optical modulator is biased to operate around a bias voltage of between about 0.6 $V_\pi$ and about 0.9 $V_\pi$, where $V_\pi$ is a voltage at which the optical modulator modulates an optical signal to a lowest intensity level.

11. The optical transmitter system of claim 1, wherein the bias voltage of the optical modulator is set based on a bit error ratio at a receiver of the optical transmission signal.

12. The optical transmitter system of claim 1, wherein the digital transmission signal encodes the data using n levels of pulse amplitudes, wherein n=2, 4, 8 or 16.

13. The optical transmitter system of claim 1, further comprising:
 an optical receiver coupled to the optical transmitter through a length of fiber optic cable, the optical receiver comprising:
  an optical detector for producing an electrical output corresponding to a detected optical signal; and
  a receiver processor for processing the electrical output of the optical detector to generate a symbol stream transmitted in the detected optical signal including a decision threshold look-up-table (DT-LUT) associating a range of values with a symbol, the DT-LUT being adaptively updateable based on measured average symbol amplitudes.

14. The optical transmitter system of claim 13, wherein the optical transmitter system is capable of transmitting data at rates of greater than 50 Gbps with a bit error ratio of less than $10^{-3}$ over the length of fiber optic cable for lengths up 250 km.

15. A method of transmitting data over an optical fibre, the method comprising:
 encoding the data using Pulse Amplitude Modulation (PAM) to provide a symbol stream;
 processing the symbol stream to generate a modulator driving signal; and
 modulating an optical signal according to the modulator driving signal using an optical modulator operating in an approximately linear region of an amplitude transfer function of the optical modulator corresponding to a non-linear region of a power transfer function of the optical modulator.

16. The method of claim 15, further comprising:
 transmitting the modulated optical signal over a length of fiber optic cable;
 detecting the modulated optical signal at a receiver to generate an electrical signal corresponding to the detected modulated optical signal; and
 determining symbols present in the electrical signal to re-construct the transmitted symbol stream.

17. The method of claim 16, wherein determining the symbols present in the electrical signal comprises using an adaptive decision threshold look-up-table providing a range of values associated with different symbols.

18. The method of claim 16, wherein the processing of the symbol stream comprises adjusting the symbol stream to compensate for chromatic dispersion of the modulated optical signal transmitted over the length of the fiber optic cable.

19. The method of claim 16, wherein the processing of the symbol stream comprises adjusting the symbol stream according to a non-linear look-up-table compensating for non-linear distortions resulting from operating the optical modulator in the non-linear region of the power transfer function.

20. The method of claim 16, wherein the method is capable of transmitting data at rates of greater than 50 Gbps with a bit error ratio of less than $10^{-3}$ over the length of fiber optic cable for lengths up 250 km.

21. The method of claim 15, wherein the modulating comprises biasing the optical modulator to operate around a bias voltage of between about 0.6 $V_\pi$ and about 0.9 $V_\pi$, where $V_\pi$ is a voltage at which the optical modulator modulates an optical signal to a lowest intensity level.

* * * * *